United States Patent [19]

Danley

[11] 4,315,025

[45] Feb. 9, 1982

[54] ROUGHAGE ANIMAL FEED

[75] Inventor: Michael M. Danley, Grimes, Iowa

[73] Assignee: Chevron Research, San Francisco, Calif.

[21] Appl. No.: 836,280

[22] Filed: Sep. 26, 1977

[51] Int. Cl.³ .................................. A01N 43/36
[52] U.S. Cl. ............................................ 424/274
[58] Field of Search ...................................... 424/274

[56] References Cited

PUBLICATIONS

Dowe et al., J. of Animal Science, vol. 16, No. 1 (Feb. 1957) pp. 93-99.

Chem. Abst. 8th Coll. Index, vol. 66-75, (1967-1971) p. 9181s.

Primary Examiner—Frederick E. Waddell
Attorney, Agent, or Firm—J. A. Buchanan, Jr.; T. G. DeJonghe; L. S. Squires

[57] ABSTRACT

A method for increasing the rate of weight gain and feeding efficiency of a ruminating animal which comprises including captan, captafol, folpet, or mixtures of these compounds, in the animal's roughage feed allotment in a weight-gaining-effective amount between 1 and 200 parts per million, based on the daily roughage feed allotment for the animal. Preferably the compound is captan, and preferably the amount of captan included in the roughage feed is below 150 ppm.

7 Claims, No Drawings

ROUGHAGE ANIMAL FEED

BACKGROUND OF THE INVENTION

The present invention relates to the use of a chemical additive to improve the feed efficiency and to increase the rate of weight gain of ruminating animals which are fed a roughage diet.

The use of chemical additives to enhance the weight gain of animals is old. For example, monensin sodium, sold under the trade name RUMENSIN, has been used as a chemical additive for feeds for ruminating animals. Monensin is a complicated organic compound having the following name: 2-(5-ethyltetrahydro-5-(tetrahydro-3-methyl-5-(tetrahydro-6-hydroxy-6-(hydroxymethyl)-3,5-dimethylpyran-2-yl)-2-furyl)-2-furyl)-9-hydroxy-beta-methoxy-alpha,gamma,2,8-tetramethyl-1,6-dioxaspiro(4,5)decane-7-butyric acid.

The present invention is particularly concerned with the use of captan and related compounds as chemical additives in feeds for animals. Captan is sold under the trade name ORTHOCIDE fungicide, and it has the following technical name: cis-N-[(trichloromethyl)thio]-4-cyclohexene-1,2-dicarboximide. Attention in the past has been given to captan in animal feeds from the point of view that seed corn treated with the fungicide captan may be available in excess of seed requirements and, hence, it would be desirable to feed the excess treated seed to animals if there are no adverse effects. An article by Dowe et al entitled "The Effects of Corn Treated with Fungicides Upon the Performance of Fattening Steers", February 1957, states at page 94:

"The rumen microorganisms that are vital to the nutritional well-being of steers are known to be sensitive to many compounds. Since the active ingredients in ARASAN and ORTHOCIDE are fungicides, it was felt that they might affect the rumen microorganisms and in turn the performance of fattening steers. This experiment was conducted to obtain information on the toxicity of these materials and their effects on the feed consumption and gain of such animals."

In Dowe et al's experiments, steers were fed various levels of captan in a "concentrate" ration of 67% corn and 33% alfalfa.

The term "concentrate feeds" is used herein to refer to feeds containing ⅓ or more corn, wheat grain, sorghum grain, or the like relatively high-carbohydrate-content constituents. The term "roughage feeds" is used herein to refer to feeds containing 70% or more alfalfa, corn-silage, forage sorghum, clover hay, fescue hay, or other relatively highly cellulosic feed.

Dowe et al reported that the best average daily weight gains were observed by them at about 370 ppm captan (calculated as 100% technical captan by weight), second-best at 184 ppm, and smallest average daily weight gains at 736 ppm captan in the concentrate feed.

In a report to the American Seed Testing Association (ASTA) entitled "Tissue Residue Study for captan and Tetrahydrophthalamide in Crossbred Fed Technical captan" dated Dec. 6, 1972, the authors mainly discuss whether captan causes any ill effects in the cattle tissue. The report also contains a table on page 8, which is as follows (except that the Table number has been changed from II to I):

TABLE I

TEST MATERIAL: Technical captan
Tissue Residue Study - Crossbred Steers
Test Period Feed Efficiency Data

| Group | Dietary Level (ppm) | Food Consumption (lbs/steer/day) | Rate of Gain (lbs/steer/day) | Feed Efficiency |
|---|---|---|---|---|
| C | None | 15.97 | 0 | 0 |
| T-I | 100 | 13.93 | 1.25 | 0.090 |
| T-II | 600 | 14.83 | −4.18 | −0.306 |
| T-III | 1200 | 14.85 | 0.50 | 0.034 |

*Total gain/feed consumed

The food consumption that was measured and presented in tabular form by the table was that of grain consumption (primarily corn grain), so that the above results were for a concentrate feed. However, the test cattle were also allowed to eat prairie clover at their pleasure. The test may not generally be regarded as valid for measurement of feed efficiency or weight gain rate because it was not intended therefor but instead was a tissue residue study.

SUMMARY OF THE INVENTION

According to the present invention, a method is provided for increasing the rate of weight gain of a ruminating animal which comprises including captan, captafol, folpet, or mixtures of these compounds, in the animal's roughage feed allotment in a weight-gaining-effective amount between 1 and 200 parts per million, based on the daily roughage feed allotment for the animal. In addition to increasing the rate of weight gain the method of the present invention has also been found effective for increasing "feed efficiency", that is, the pounds of weight gained per pound of feed consumed.

Unless otherwise indicated, the ppm's of the additive compound are by weight based on the weight of roughage, and the ppm's are for the technically pure compound.

The formulas for captan, captafol and folpet are as follows:

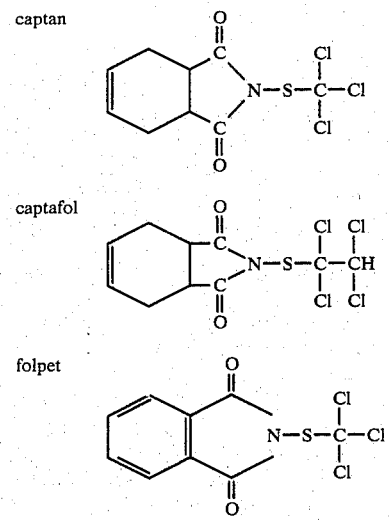

Procedures for making these chemicals are known in the art; see, for instance, U.S. Pat. No. 2,553,770 with respect to captan and captafol and U.S. Pat. No. 3,178,447 with respect to folpet (also sold under the trademark name DIFOLATAN fungicide).

The chemical additive compound desirably is thoroughly mixed with the roughage feed before roughage feed is fed to the animal. Other efficient methods of introducing the chemical additive can be used, provided it is introduced in amounts, relative to roughage feed, in accordance with the present invention. Preferred amounts of the additive compound are from 1 to 200 ppm, more preferably between 5 and 150 ppm, based on the daily roughage feed allotment of the ruminating animal.

Preferably the chemical additive compound used is captan. Particularly preferred amounts of captan are 5 to 100 ppm based on daily roughage feed.

I have found that with roughage feeds there is a surprisingly higher rate of weight gain and generally more efficient feed utilization at relatively low dosage of captan compared to prior art dosage levels of captan indicated as most desirable for feeding to ruminating animals, especially dosages indicated as most desirable for concentrate feeds.

The present invention is especially concerned with roughage feeds as opposed to concentrate feeds. As mentioned earlier, roughage feeds contain mostly cellulosic constituents such as feed allotments containing high contents of alfalfa or other hays. On the other hand, concentrates contain higher amounts of carbohydrates, achieved most typically by high corn grain content in the feed. Usually roughage feeds are fed to growing ruminating animals between weaning and feed-lot (fattening) periods. During the fattening period, the ruminating animals are typically fed a concentrate feed allotment for rapid gain. The fattening period is often also referred to as the "finishing period".

Concentrates result in a more rapid weight gain than do the mostly cellulosic roughage feed allotments. Concentrates contain materials such as corn grain or other grain in relatively large amounts, usually at least ⅓, and generally upwards of 40% to 50%. The corn grain is about 80% carbohydrate or starchy material, and of this about 98% is available to the animal. On the other hand, roughage feeds typically contain materials such as alfalfa hay, which has a high fiber or cellulosic content in the range of 50% to 60%, and of this only about 50% is usable by the animal for weight gain. The percentages given herein are all by weight unless otherwise indicated.

The term "ruminating animals" is used herein in its ordinary sense, although the invention is primarily concerned with beef cattle such as heifers and steers and with sheep, especially young sheep, that is, lambs. We have found that the method of the present invention is especially advantageous for weight gain on beef cattle and lambs during the period when they are fed roughage rations.

Because of increasing costs of concentrate feeds, some ruminating animals are now being finished on roughage feed rations. Although this slows the fattening of the animals, roughage feed is less costly than concentrate feed. Accordingly, although the present invention is typically most advantageously practiced between weaning and finishing, it may also be practiced during the finishing period if the finishing is conducted on roughage feed rations.

According to another embodiment of the present invention, a feed composition is provided which comprises roughage and captan, captafol, folpet, or mixtures thereof, in a weight-gaining-effective amount between 1 and 200 ppm.

Preferably the amount of the compound is between 5 and 150 ppm.

Preferably the compound is captan.

The term "weight-gaining-effective amount" is used herein to mean that the additive compound is present in the roughage feed allotment in an amount sufficient to enhance weight gain compared to no use of the compound in the roughage.

EXAMPLES

Example 1

A group of thirty-six lambs was fed a roughage feed allotment of 95% alfalfa hay and 5% corn grain for 60 days. The lambs did not eat food other than the allotment. Table II below shows the weight gain in pounds and also pounds of feed per pound of weight gain, both expressed as percentage above the base case of no captan additive.

TABLE II

| ppm captan | Average Daily Weight Gain, lbs | Lbs of Feed per lb of Weight Gain |
|---|---|---|
| 0 | base | base |
| 80 | 28.9 | −23.1 |
| 260 | 4.1 | −12.2 |
| 440 | 26.4 | −16.8 |

From the above table, it can be noted that especially good performance in terms of average daily weight gain was found when using 80 ppm captan in the roughage feed allotment. The average daily weight gain in pounds was 28.9% higher when using 80 ppm captan in the roughage feed as opposed to no use of captan in the roughage feed. Also, the pounds fed per pounds of gain was 23.1% lower when including 80 ppm in the roughage feed allotment as opposed to including no captan in the feed allotment.

Referring to the data for 260 ppm captan in Table II above, these data are not believed to be especially reliable because there was a decreased roughage intake by the lambs in this test sample.

Example 2

This example provides results on a concentrate feed ration for lambs. The test period was 58 days long and the same group of lambs was used in this test as in the Example 1 test. The concentrate feed ration contained an amount of corn which would be on the low side for a concentrate ration, namely 60% corn grain and 40% alfalfa hay. Table III below lists the results of this test:

TABLE III

| ppm captan | Average Daily Weight Gain, lbs | Lbs of Feed per lb of Weight Gain |
|---|---|---|
| 0 | base | base |
| 80 | 9.2 | −1.8 |
| 260 | 12.9 | 4.6 |
| 440 | 16.2 | −1.2 |

From the above results, it may be noted that the best results in terms of average daily weight gain were achieved at 440 ppm captan in the concentrate ration. This can be contracted to the most favorable results for the roughage ration in Example 2, which was achieved at 80 ppm captan.

Example 4

A group of five steers was fed a roughage feed allotment of 95% fescue-clover hay and 5% corn grain in a 5×5 Latin Square digestibility trial. The trail consisted of five 14-day adjustment periods each followed by a 7-day collection period. Table IV below presents the results of this test.

TABLE IV

| | ppm captan | | | | |
|---|---|---|---|---|---|
| Item | 0 | 80 | 160 | 320 | 640 |
| Dry Matter | | | | | |
| Digested ("Dig"), % | 65.75 | 66.4 | 64.91 | 64.38 | 62.03 |
| Acid Detergent Fiber Dig, % | 54.84 | 55.59 | 52.91 | 52.31 | 48.47 |
| Cell Wall Constituents Dig, % | 63.25 | 63.53 | 62.02 | 61.83 | 61.26 |
| Cellulose Dig, % | 64.74 | 65.79 | 64.20 | 63.29 | 63.95 |
| Crude Protein (CP) Dig, % | 59.75 | 58.84 | 57.59 | 56.67 | 53.93 |
| CP Retained, g/day | 236.8 | 229.1 | 225.8 | 220.7 | 206.1 |

From the above results, it may be noted that the best results in terms of digestibility of dry matter, acid detergent fiber, cell wall constituents and cellulose were achieved with 80 ppm captan. No level of captan improved crude protein metabolism.

Example 5

In this test steers were fed a roughage feed allotment containing 75% hay and 25% corn. Table V below tabulates the results of the test.

TABLE V

| ppm captan | Average Daily Weight Gain, lbs | Lbs of Feed per lb of Weight Gain |
|---|---|---|
| 0 | base | base |
| 75 | 66.3 | −45.1 |
| 150 | 77.9 | −53.6 |
| 300 | 62.1 | −45.2 |
| 600 | 34.7 | −33.3 |

As can be seen from this table, the best response for average daily weight gain and pounds feed per pound of gain was achieved at around 150 ppm captan instead of about 370 ppm captan, as has been reported in the prior art for concentrate feeds.

Example 6

The Two-Stage In Vitro Digestion Technique (Tilley and Terry, J. Brit. Grassld, Sc. 18:104–11, 1963) was used in the laboratory to determine the effect of captan on the dry matter digestibility of roughage feedstuffs following 12 and 24 hour incubation with buffered rumen fluid. Table VI below summarizes the results of this test.

TABLE VI

| | % In Vitro Dry Matter Digestibility | | | | | |
|---|---|---|---|---|---|---|
| | Alfalfa Hay | | Corn Cobs | | Corn Silace | |
| ppm captan | 12 hr | 24 hr | 12 hr | 24 hr | 12 hr | 24 hr |
| 0 | 64.46 | 64.02 | 25.34 | 44.96 | 42.59 | 59.73 |
| 20 | 64.09 | 66.23 | 25.56 | 42.12 | 41.12 | 61.04 |
| 40 | 64.53 | 66.18 | 24.65 | 43.20 | 40.41 | 60.07 |
| 60 | 65.76 | 64.82 | 26.75 | 43.12 | 41.45 | 60.10 |
| 80 | 66.02 | 66.23 | 24.88 | 43.85 | 41.98 | 61.93 |
| 100 | 64.37 | 66.01 | 24.00 | 42.07 | 42.37 | 61.75 |

As can be seen from this table, captan was found to best improve the digestibility of roughage feedstuffs at 40 to 100 ppm captan.

Example 7

The effect of captan on the in vitro dry matter digestibility of roughage feedstuffs was determined using the Two-Stage Digestion Technique (Tilley and Terry, J. Brit. Grassld. SC. 18:104–11, 1963). A 12-, 24- or 48-hour incubation with buffered rumen fluid was used. The results of this test are summarized in Table VII.

TABLE VII

| | % Dry Matter Digestibility | | | | |
|---|---|---|---|---|---|
| | Alfalfa Hay | | Corn Cobs | | Solka Floc |
| ppm captan | 12 hr | 24 hr | 24 hr | 48 hr | 24 hr |
| 0 | 54.54 | 68.50 | 39.59 | 55.59 | 21.36 |
| 40 | 56.77 | 69.30 | 40.81 | 55.81 | 19.83 |
| 80 | 52.15 | 66.98 | 39.93 | 51.01 | 24.20 |
| | Acetate : Propionate Ratio | | | | |
| 0 | 3.80 | 3.07 | 3.21 | 3.36 | 2.30 |
| 40 | 3.46 | 2.98 | 3.03 | 3.68 | 2.80 |
| 80 | 3.47 | 3.20 | 3.42 | 2.78 | 2.51 |

The above results indicate that dry matter digestibility of roughage feedstuffs is improved with 40 to 80 ppm captan.

Example 8

In this test the effect of captan on dry matter digestibility of roughage feedstuffs following 12 and 24 hours incubation with buffered rumen fluid was determined in the laboratory using the Two-Stage In Vitro Digestion Technique (Tilley and Terry, J. Brit. Grassld. Sc. 18:104–11, 1963). The results of this test are presented in Table VIII.

TABLE VIII

| | Solka Floc | | Grass Hay | Corn Stalks | Corn Stalks and Fecal | |
|---|---|---|---|---|---|---|
| ppm captan | 12 hr | 24 hr | 12 hr | 12 hr | 12 hr | 24 hr |
| | Digestibility, % | | | Digestivility, % | | |
| 0 | 17.64 | 20.32 | 36.35 | 41.70 | 22.17 | 33.37 |
| 20 | 16.56 | 22.24 | 29.17 | 43.04 | 22.73 | 32.98 |
| 40 | 17.95 | 23.50 | 36.27 | 42.86 | 20.20 | 32.75 |
| 60 | 21.20 | 27.43 | 36.64 | 46.88 | 22.04 | 36.22 |
| 80 | 22.78 | 32.38 | 42.34 | 46.52 | 23.24 | 39.88 |
| 100 | 19.42 | 26.28 | 33.62 | 40.28 | 29.30 | 41.32 |
| 150 | 12.96 | 22.73 | 33.10 | 36.00 | 28.73 | 36.98 |
| 200 | 16.03 | 23.67 | 30.08 | 39.65 | 24.45 | 32.91 |

From the above results, increases in dry matter digestibility of roughage feedstuffs occurred with 60 to 150 ppm captan. Generally, responses were maximum between 60 and 80 ppm captan.

Example 9

A laboratory in vitro test was conducted to determine the effect of captan on the digestibility of alfalfa hay:-corn grain combinations. Dry matter digestibility was determined with the Two-Stage In Vitro Digestibility Technique (Tilley and Terry, J. Brit. Grassld. Sc. 18:104–11, 1963). The results of this test are presented in Table IX.

TABLE IX

| | ppm captan | | | |
|---|---|---|---|---|
| Ratio Alfalfa Hay:Corn Grain | 0 | 40 | 80 | 160 |
| | Digestibility, % | | | |
| 100:0 | 53.72 | 55.65 | 55.30 | 52.02 |
| 80:20 | 57.80 | 62.40 | 64.86 | 66.87 |
| 60:40 | 65.96 | 67.44 | 70.28 | 70.91 |

TABLE IX-continued

| Ratio | ppm captan | | | |
|---|---|---|---|---|
| | 0 | 40 | 80 | 160 |
| Alfalfa Hay:Corn Grain | Digestibility, % | | | |
| 40:60 | 70.45 | 73.88 | 74.84 | 77.64 |
| 20:80 | 71.30 | 76.18 | 76.94 | 80.27 |
| 0:100 | 76.98 | 81.55 | 83.91 | 89.69 |

The above results indicate that addition of corn to alfalfa hay increases the amount of captan required for maximum improvement in dry matter digestibility.

What is claimed is:

1. A method for increasing the weight gain of a ruminating animal which comprises including captan in the animal's roughage feed allotment in a weight-gaining-effective amount between 1 and 200 parts per million based on the daily roughage feed allotment for the animal wherein said roughage feed contains at least 70% by weight alfalfa, forage sorghum, hay or other cellulosic feed having over 50% cellulose content.

2. A method in accordance with claim 1 wherein the amount of the captan is between 5 and 150 parts per million.

3. A method in accordance with claim 2 wherein the animal is beef cattle or lamb.

4. A method in accordance with claim 3 wherein the amount of the captan is 5 to 100 parts per million.

5. A roughage feed ration for beef cattle or lamb comprising roughage and captan in a weight-gaining-effective amount between 1 and 200 parts per million based on the weight of the roughage in the feed ration.

6. A roughage feed ration in accordance with claim 5 wherein the amount of captan is 5 to 100 parts per million.

7. A method for increasing the weight gain efficiency of beef cattle or lamb which comprises including between 1 and 200 parts per million captan in the daily roughage feed allotment for the beef cattle or lamb.

* * * * *